United States Patent [19]

Kinkade

[11] 4,261,712

[45] Apr. 14, 1981

[54] ELECTROSTATIC AIR PURIFIER

[76] Inventor: Lloyd E. Kinkade, 231 W. Dixon Ave., Dayton, Ohio 45419

[21] Appl. No.: 125,493

[22] Filed: Feb. 28, 1980

[51] Int. Cl.³ .............................................. B03C 3/01
[52] U.S. Cl. ..................................... 55/126; 55/139; 55/143; 55/151; 55/154; 361/235; 339/154 A; 363/142
[58] Field of Search ................................ 55/136–138, 55/124–126, 139, 140–143, 151–153, 145, 146, 154; 361/235; 307/10 R, 9, 150, 151; 363/142; 339/154 A

[56] References Cited

U.S. PATENT DOCUMENTS

| | | | |
|---|---|---|---|
| 2,813,595 | 11/1957 | Fields | 55/137 |
| 2,979,158 | 4/1961 | Vlier, Jr. | 55/139 |
| 3,191,362 | 6/1965 | Bourgeois | 55/126 |
| 3,626,668 | 12/1971 | Cardiff | 55/126 |
| 3,740,926 | 6/1973 | Duval | 55/126 |
| 3,745,750 | 7/1973 | Arff | 55/124 |
| 3,988,131 | 10/1976 | Kanazawa et al. | 55/126 |
| 4,038,559 | 7/1977 | Chan et al. | 307/51 |
| 4,089,661 | 5/1978 | Milan | 55/137 |

FOREIGN PATENT DOCUMENTS

931625  7/1963  United Kingdom .................... 55/124

*Primary Examiner*—Bernard Nozick
*Attorney, Agent, or Firm*—Jacox & Meckstroth

[57] ABSTRACT

A housing includes a removable top cover and encloses a removable electrostatic precipitating unit formed by a tandem arrangement of two cells each including parallel spaced collecting plates preceded by interspaced particle charging wires or elements. An air circulating fan is enclosed within the housing and is driven by a low voltage two speed DC motor. A first converter provides for converting a high voltage AC power supply to the low voltage DC power supply for the fan, and a second converter provides for converting the low voltage DC power to a DC power supply of several thousand volts for operating the electrostatic precipitating unit. Means are also provided for by-passing the first converter and for operating the fan and the electrostatic precipitating unit from a low voltage DC power supply.

9 Claims, 4 Drawing Figures

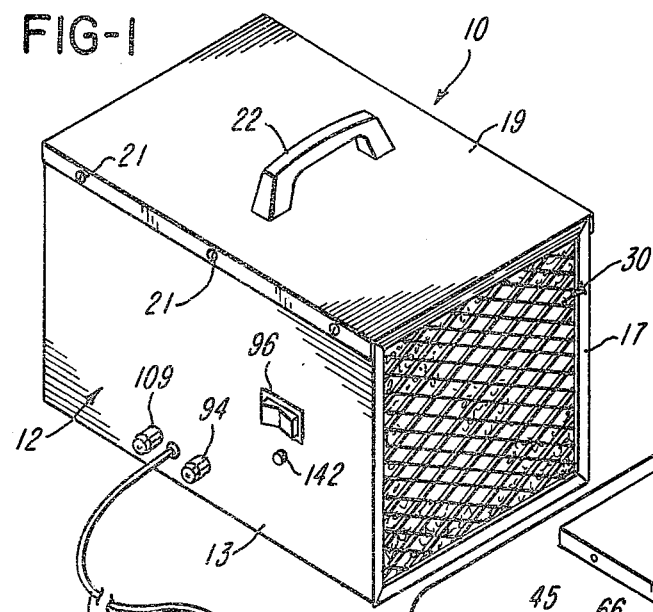
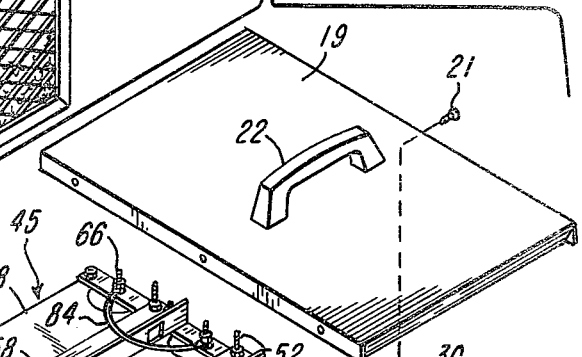
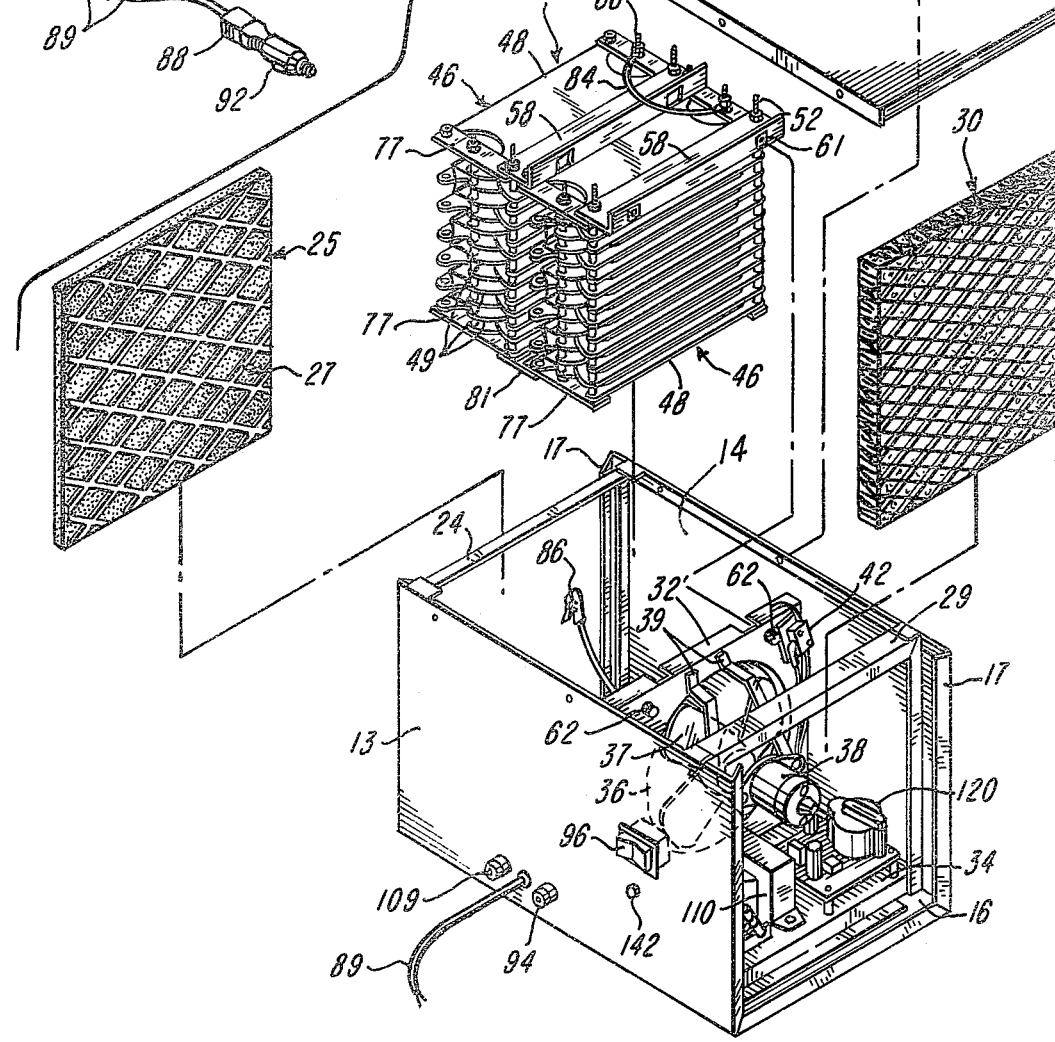

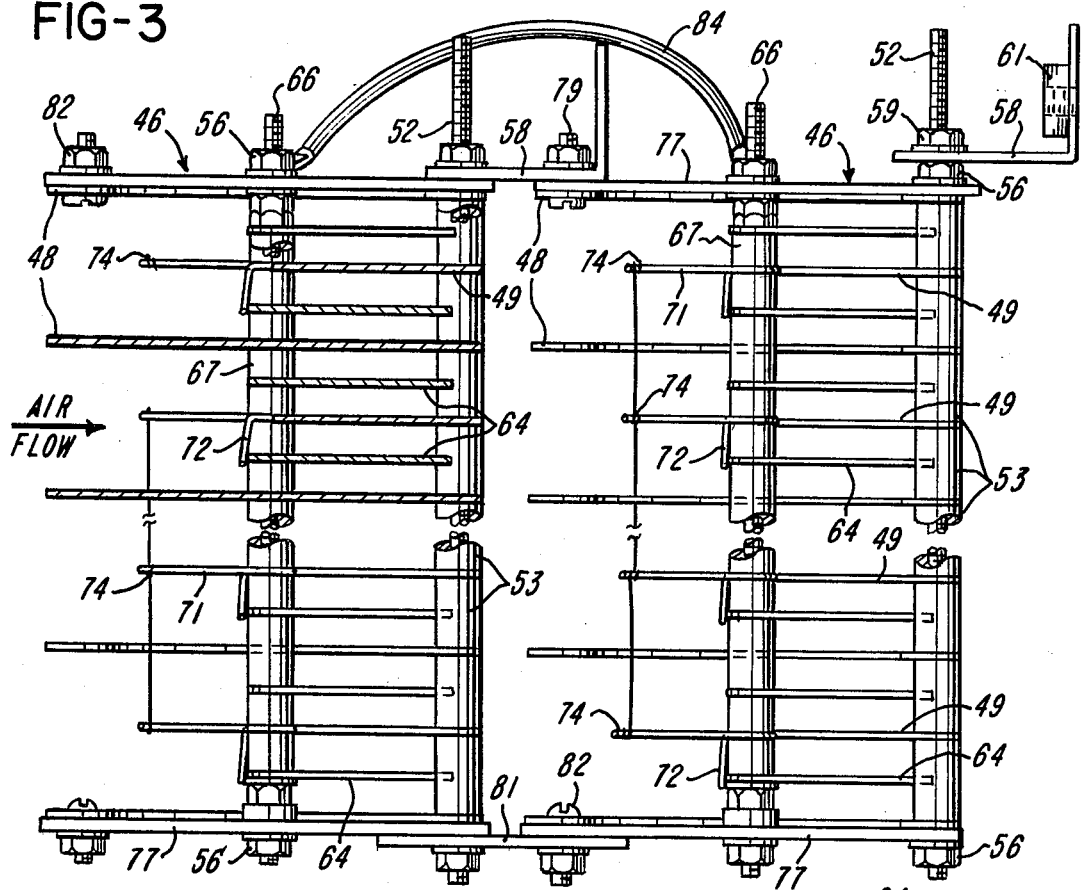
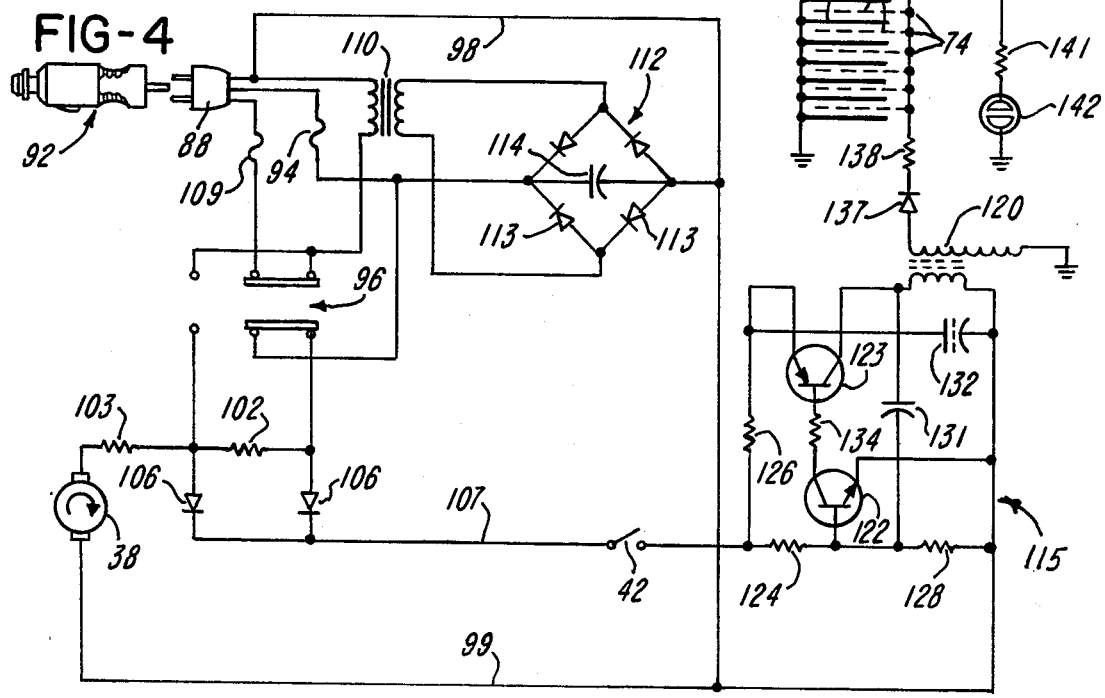

ELECTROSTATIC AIR PURIFIER

BACKGROUND OF THE INVENTION

In the art of portable electrostatic air purifiers, there have been various designs either constructed or proposed, such as, for example, the air purifiers disclosed in U.S. Pat. Nos. 2,979,158, 3,191,362 and 3,745,750. In the design of such a unit, it is not only desirable for the unit to be compact in size, but also to be effective in operation so that the unit will effectively separate or remove sub-micron particles as well as larger particles within the air in the room or area where the purifier is to be used. It is also desirable for the air purifier unit to be constructed so that the particle separating and filter components may be easily and conveniently removed for cleaning or replacement. It is further desirable for a portable electrostatic air purifier to be constructed for operation from either a 120 volt AC power supply or from a twelve volt DC power supply so that the purifier has a wide range of uses and may be used not only in the home or office but also in motor vehicles such as a recreational vehicle, bus or trailer or cabs of mobile equipment.

SUMMARY OF THE INVENTION

The present invention is directed to an improved electrostatic air purifier which provides all of the desirable features mentioned above and, in particular, is highly effective in operation while also being compact in size. The purifier also provides for conveniently removing the electrostatic particle precipitating cells and the filter components for cleaning or service or replacement. The electrostatic air purifier of the invention is also adapted to be selectively operated from either a low voltage DC power supply or from a 120 volt AC power supply by simply using or not using a plug adapter for the power supply cord. The air purifier of the invention is also constructed so that all of the AC operated electrical components are electrically isolated to avoid any possibility of an electrical shock.

Other features and advantages of the invention will be apparent from the following description, the accompanying drawings and the appended claims.

BRIEF DESCRIPTION OF THE DRAWINGS

FIG. 1 is a perspective view of an electrostatic air purifier constructed in accordance with the invention;

FIG. 2 is an exploded perspective view of several components of the air purifier shown in FIG. 1;

FIG. 3 is an elevational view, in part section, of the electrostatic particle precipitating unit shown in FIG. 2; and FIG. 4 is a schematic electrical diagram for the air purifier shown in FIGS. 1-3.

DESCRIPTION OF THE PREFERRED EMBODIMENT

FIG. 1 shows a portable electrostatic air purifier unit 10 which includes a cabinet or housing 12 having opposite side walls 13 and 14 integrally connected by a bottom wall 16 (FIG. 2). While the walls 13, 14 and 16 are illustrated as being formed from a sheet metal panel, the walls may also be integrally molded of a suitable rigid plastics material. The walls 13, 14 and 16 have inwardly projecting flanges 17 on each end of the housing 12, and the side walls define a top opening which is enclosed by a removable top cover 19 secured to the side walls 13, and 14 by a set of screws 21. A handle 22 is secured to the top cover 19 which is also illustrated as a formed sheet metal panel, and the handle 22 provides for conveniently transporting the unit 10.

The front or inlet end of the housing 12 includes a formed sheet metal frame 24 which is spaced inwardly from the corresponding flange 17 to define a slot or channel for receiving a replaceable prefilter panel 25. The panel 25 is formed of an open-cell foam material and is sandwiched between two grills 27 formed of expanded sheet metal. The assembly of the filter panel 25 and grills 27 is inserted by sliding the assembly downwardly between the side walls 13 and 14 and in the slot defined between the end flange 17 and frame 24. Thus after the top cover 19 is removed, the filter panel 25 might be quickly removed for cleaning with soap and water so that the panel remains effective for prefiltering larger particles of lint and dust from the air to be purified.

At the opposite or outlet end of the housing 12, another formed sheet metal frame 29 is secured to the walls 13 and 14 and is spaced inwardly from the corresponding end flange 17 to define a slot or channel for slideably receiving a honeycomb-type activated charcoal filter panel 30. Thus the filter panel 30 may also be quickly and conveniently replaced after the top cover 19 is removed.

Another sheet metal frame 32 (FIG. 2) is spaced inwardly from the frame 29 and is rigidly secured to a formed sheet metal base 34 mounted on the bottom wall 16 of the housing 12. The frame 32 defines a circular opening 36, and a fan blade 37 is supported within the opening 36 by the shaft of a twelve volt D.C. fan motor 38. The motor 38 is supported by two formed metal brackets 39 secured to the frame 32 which also supports an interlock switch 42 having an actuating lever for sensing when the top cover 19 is in position on the walls 13 and 14.

Between the frames 24 and 32, the formed sheet metal base within the housing 12 supports a removable two-stage electrostatic precipitator unit 45 (FIGS. 2 and 3) which is formed by connecting two precipitating cells 46 in tandem. Each of the cells 46 includes a series of particle collecting plates 48 and smaller collecting plates 49 which are supported in vertically spaced relation by a pair of threaded rods or posts 52 and tubular spacers 53. The plates 48 and 49 and the spacing tubes 53 are rigidly secured to the threaded rods 52 by a set of upper and lower nuts 56, and an angular support bracket 58 is secured to the upper end portions of the rods 52 by another set of nuts 59. The bracket 58 for the cell 46 closest to the frame 32 carries a pair of nuts 61 which are adapted to receive a corresponding pair of thumb screws 62 (FIG. 2) forming the sole connection for securing the electrostatic precipitation unit 45 to the frame 32 within the housing 12. The bracket 58, nuts 61, and screws 62 also form an electrical ground connection for the plates 48 and 49 to the housing 12, as illustrated in FIG. 4.

A series of vertically spaced plates 64 are supported between the plates 48 and 49 by a pair of threaded rods or posts 66 and tubular spacers 67. Each of the spacers 67 also has a circumferential center groove which receives a wire-formed hanger 71 having a downwardly projecting end or tip portion 72 engaging the plate 64 therebelow. The hangers 71 on each cell 46 support a continuous ionizing or particle charging wire 74 which extends horizontally between each pair of adjacent plates 48 in front of the plates 49 relative to the air flow as shown in FIG. 3. The wire 74 is arranged in a serpentine-like manner back and forth across the hangers 71.

A set of upper and lower electrical insulating strips 77 form rigid connections between the threaded support rods or posts 52 and 66 for each cell 46. The uppermost corresponding plates 48 of the two tandem arranged cells 46 are rigidly and electrically connected by the intermediate L-shaped metal bracket 58 and bolts 79 which also rigidly connect the corresponding insulator strips 77. The bottom plates 48 of the tandem arranged cells 46 are rigidly connected by a pair of electrical insulating strips 81 and bolts 82 so that the cells 46 are rigidly connected to form the unit 45. A conductor 84 electrically connects the support posts 66, plates 64 and wires 74 of the two cells 46, and one of the posts 66 receives a releasable pinch clip 86 (FIG. 2) after the unit 45 is inserted into the housing 12 and secured by the two screws 62.

Referring to the electrical diagram shown in FIG. 4, the air purifier unit 10 may be selectively operated from either a 120 volt AC power supply or a 12 volt DC power supply. When the unit is operated from the DC power supply, the plug 88 (FIG. 1) of the power supply cord 89, receives an adaptor 92 which fits into a conventional socket for a cigarette lighter commonly used in a motor vehicle. When the plug 88 is coupled to the adapter 92, the positive side of the 12 volt DC power is supplied through a fuse 94 to the center contact of a double pole - double throw fan speed selector switch 96 having a center off position. The negative side of the DC power supply is directed by conductors 98 and 99 to one side of the 12 volt DC fan motor 38. When the switch 96 is selected for a low speed fan operation, as shown in FIG. 4, the positive side of the DC power supply is connected to the motor 38 through a set of resistors 102 (4 ohms, 10 watt) and 103 (7 ohms, 10 watt). A pair of diodes 106 (IN4004) are connected to a conductor 107 extending from the motor speed selector switch 96, and the conductor 107 extends to the 12 volt DC interlock switch 42.

When it is desired to operate the air purifier unit 10 from a 120 volt AC power supply, the adapter 92 is removed from the plug 88, and one side of the AC power supply line is conducted to the fan speed switch 96 through a fuse 109. The other side of the line is conducted to a transformer 110 which supplies twelve-volt AC power to a bridge rectifier 112 (MDA 970-1) incorporating a set of diodes 113 and a capacitor 114 (1,000 m.f., 25 volts D.C. working voltage). The 12 volt DC power is conducted from the rectifier 112 to the motor 38 through the selector switch 96 and is also supplied to the conductors 99 and 107. Thus the transformer 110 and rectifier 112 function as a converter for converting the 120 volt AC power supply to a 12 volt DC power supply.

As also shown in FIG. 4, the 12 volt DC power supplied to the conductors 99 and 107, is converted by an oscillator circuit 115 to 12 volt AC which is supplied to the primary coil of a second transformer 120. The circuit 115 includes a set of transistors 122 (2N2222) and 123 (TIP-32), a resistor 124 (100K), a resistor 126 (5 ohms, 3.25 watts), a resistor 128 (47K), a capacitor 131 (500 pf) and another capacitor 132 (10 mf, 25 working volts, DC). The transistors 122 and 123 are connected through a resistor 134 (330 ohms).

The transformer 120 converts the 12 volt AC power to a substantially higher voltage on the order of 5,000 to 6,000 volts, and a diode 137 converts this high voltage AC power to a DC power which is supplied through a resistor 138 (470K) to the plates 64 and ionizing wires 74 of the electrostatic precipitator cells 46. The high voltage DC power is also directed through a resistor 141 (50 meg. ohms) to a neon indicating light 142 which is mounted on the front wall 13 of the housing 12 for indicating when the electrostatic precipitator unit 45 is energized or when the precipitator needs cleaning indicated by the light going out.

From the drawings and the above descriptions, it is apparent that an electrostatic air purifier unit constructed in accordance with the invention provides desirable features and advantages. As one primary feature, the unit is adapted to be selectively operated from either a 120 volt AC power supply or a 12 volt DC power supply by means of either using or omitting the plug adapter 92. Thus the unit may be conveniently used in an office or in the kitchen, bathroom or workshop of a home for removing sub-micron particles in smoke or odors as well as larger dust or lint particles.

The air purifier unit of the invention also effectively removes the particles from the air in a unit which is compact in construction so that it minimizes the space required for the unit. In particular, the tandem arrangement of the electrostatic cells 46 provides very effective cleaning for a compact unit. That is, any sub-micron particles which manage to pass through the first cell 46 on the left in FIG. 3, are reionized by the wires 74 of the second cell 46 on the right in FIG. 3 and are attracted to and collected by the second set of plates 48 and 49.

As another feature, the two-stage electrostatic precipitator unit 45 may be quickly and conveniently removed from the housing 12 after the top cover 19 is removed so that the unit 45 may be cleaned with soap and water or by placing the unit in an automatic dishwashing machine. As mentioned above, the filter panels 25 and 30 may also be quickly removed from the housing 12 when the top cover 19 is removed for either cleaning or replacement. As also apparent from FIG. 4, the electrical operating circuit not only provides for operating the air purifier unit of the invention from either 120 volt AC or a 12 volt DC power supply, but also isolates all of the AC components from the housing 12, thereby avoiding any possibility of receiving an electrical shock.

While the form of precipitator unit herein described constitutes a preferred embodiment of the invention, it is to be understood that the invention is not limited to this precise form of apparatus and that changes may be made therein without departing from the scope and spirit of the invention as defined in the appended claims.

The invention having thus been described, the following is claimed:

1. In an electrostatic air purifier unit including a housing defining an air inlet and an air outlet, an electrostatic particle precipitating unit disposed within said housing and including a plurality of particle charging elements disposed in spaced relation to a plurality of oppositely charged collecting plates, a fan disposed within said housing and driven by a motor for directing a flow of air from said inlet to said outlet and through said electrostatic precipitating unit, an air filter panel supported by said housing to filter the air flow, and a power supply circuit for charging said electrostatic precipitating unit and for operating said fan motor, the improvement wherein said fan motor comprises a low voltage D.C. motor, first converter means for converting a high voltage A.C. power supply to said unit to said low voltage D.C. power supply for said fan motor, second converter means for converting said low voltage D.C. power supply to a substantially higher voltage D.C. power supply for said electrostatic precipitating unit, and means for selectively by-passing said first converter means to provide for operating said purifier unit from a low voltage D.C. power supply.

2. An air purifier unit as defined in claim 1 wherein said electrostatic precipitating unit comprises a plurality of separate electrostatic cells each including a stack of said collector plates and said spaced particle charging elements, means for connecting said cells in tandem with corresponding said collecting plates and charging elements electrically connected, and releasable mounting means for removing said connected cells as a unit to facilitate cleaning of said unit.

3. An air purifier unit as defined in claim 1 and including a frame disposed within said housing and supporting the bottom of said electrostatic precipitating unit, and releasable coupling means for securing said precipitating unit to said frame and for forming an electrical grounding connection with said frame and said housing.

4. An air purifier unit as defined in claim 1 wherein said housing comprises opposite sidewalls integrally connected by a bottom wall to define an open top chamber, a removable cover member closing said chamber, and releasable coupling means supporting said electrostatic precipitating unit and providing for removing said precipitating unit upwardly from said chamber when said cover member is removed.

5. An air purifier unit as defined in claim 1 wherein said D.C. motor for said fan comprises a 12 volt motor, said first converter means comprise a transformer and a bridge rectifier for converting 120 volts A.C. power to 12 volts D.C. power, and said second converter means comprise a set of transistors, a transformer and a diode for converting said 12 volts D.C. to several thousand volts D.C. for said separating unit.

6. An air purifier unit as defined in claim 1 where said housing forms an electrical ground for said higher voltage D.C. power supplied from said second converter means to said electrostatic precipitating unit, and said first converter means and the low voltage portion of said second converter means are electrically isolated from said housing.

7. In an electrostatic air purifier unit including a housing defining an air inlet and an air outlet, an electrostatic particle precipitating unit disposed within said housing and including a plurality of particle charging elements disposed in spaced relation to a plurality of oppositely charged collecting plates, a fan disposed within said housing and driven by a motor for directing a flow of air from said inlet to said outlet and through said electrostatic precipitating unit, an air filter panel supported by said housing to filter the air flow, a power supply circuit for charging said electrostatic precipitating unit and for operating said fan motor, and a power supply cord and plug connected to said circuit, the improvement wherein said fan motor comprises a 12 volt D.C. motor, first converter means for converting a 120 volt A.C. power supply to said unit to said 12 volt D.C. power supply for said fan motor, second converter means for converting said 12 volt D.C. power supply to several thousand volts D.C. power supply for operating said electrostatic precipitating unit, and means including an adapter removably mounted on said plug for selectively by-passing said first converter means to provide for operating said purifier unit from 12 volt D.C. power supply.

8. An air purifier unit as defined in claim 7 wherein said electrostatic precipitating unit comprises a plurality of separate electrostatic cells each including a stack of said collector plates and said spaced particle charging elements, insulator means rigidly connecting said cells in tandem and conductor means electrically connecting corresponding said collecting plates and charging elements, a frame member disposed within said housing, and releasably attaching said connected cells to said frame member and for removing said cells as a unit from said housing to facilitate cleaning of said unit.

9. An electrostatic air purifier unit comprising a housing defining an air inlet and an air outlet, an air prefilter panel supported by said housing adjacent said inlet to filter incoming air, an electrostatic particle precipitating unit disposed within said housing and including a plurality of electrostatic cells each having a stack of spaced collector plates and spaced particle charging elements in interspaced relation, means for connecting said cells in tandem with corresponding said collecting plates and charging elements electrically connected, releasable mounting means providing for removing said precipitating unit to facilitate cleaning of said unit, a fan disposed within said housing and driven by a motor low voltage D.C. for directing a flow of air through said prefilter panel and said electrostatic precipitating unit to said outlet, a carbon filter panel disposed adjacent said outlet, and a power supply circuit for charging said electrostatic precipitating unit and for operating said fan motor said power supply circuit including, first converter means for converting a high voltage A.C. power supply to said low voltage D.C. power supply for said fan motor, second converter means for converting said low voltage D.C. power supply to a D.C. power supply of several thousand volts for operating said electrostatic precipitating unit, and means for selectively by-passing said first converter means to provide for operating said purifier unit from a low voltage D.C. power supply.

* * * * *